United States Patent
Meylan et al.

(10) Patent No.: US 10,511,992 B2
(45) Date of Patent: Dec. 17, 2019

(54) PRIORITIZING PACKETS IN WIRELESS COMMUNICATIONS

(71) Applicant: QUALCOMM Incorporated, San Diego, CA (US)

(72) Inventors: Arnaud Meylan, San Diego, CA (US); Gavin Bernard Horn, La Jolla, CA (US); Yu-Ting Yu, Union City, CA (US); Aziz Gholmieh, Del Mar, CA (US); Yue Yang, San Diego, CA (US); Shailesh Maheshwari, San Diego, CA (US); Sitaramanjaneyulu Kanamarlapudi, San Diego, CA (US); Vaibhav Kumar, Encinitas, CA (US); Sivaramakrishna Veerepalli, San Diego, CA (US); Srinivasan Balasubramanian, San Diego, CA (US); Srinivas Reddy Mudireddy, San Diego, CA (US); Vanitha Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 15/803,406

(22) Filed: Nov. 3, 2017

(65) Prior Publication Data
US 2018/0176816 A1 Jun. 21, 2018

Related U.S. Application Data

(60) Provisional application No. 62/436,376, filed on Dec. 19, 2016.

(51) Int. Cl.
*H04L 12/851* (2013.01)
*H04L 12/865* (2013.01)
(Continued)

(52) U.S. Cl.
CPC ..... *H04W 28/0268* (2013.01); *H04L 47/2433* (2013.01); *H04L 47/2441* (2013.01);
(Continued)

(58) Field of Classification Search
CPC . H04L 47/14; H04L 47/2408; H04L 47/2433; H04L 47/2441; H04L 47/245;
(Continued)

(56) References Cited

U.S. PATENT DOCUMENTS 7,330,918 B2 * 2/2008 Yamamoto ............ H04L 47/24
370/229
7,782,779 B2 * 8/2010 Pozhenko ......... H04L 29/06027
370/235

(Continued)

FOREIGN PATENT DOCUMENTS

EP 1531587 A1 5/2005
WO WO-2008040725 A1 4/2008

OTHER PUBLICATIONS

International Search Report and Written Opinion—PCT/US2017/060198—ISA/EPO—dated Apr. 24, 2018.

*Primary Examiner* — Alpus Hsu
(74) *Attorney, Agent, or Firm* — Arent Fox LLP

(57) ABSTRACT

Aspects of the present disclosure describe transmitting data in wireless communications. A set of packets for transmission in a defined sequence can be received where the set of packets includes two or more packets. It can be detected that a packet, of the set of packets, is a prioritized packet type. The packet can be prioritized for transmission ahead of its order in the defined sequence based on the detection of the prioritized packet type. The packet can be transmitted ahead of its order in the defined sequence to an access point.

30 Claims, 10 Drawing Sheets

(51) Int. Cl.
  *H04W 28/02* (2009.01)
  *H04W 72/12* (2009.01)
  *H04L 12/801* (2013.01)

(52) U.S. Cl.
  CPC ..... *H04L 47/6275* (2013.01); *H04W 72/1242* (2013.01); *H04L 47/14* (2013.01)

(58) Field of Classification Search
  CPC ........... H04L 47/6215; H04L 47/6275; H04W 28/0268; H04W 72/1242
  See application file for complete search history.

(56) References Cited

U.S. PATENT DOCUMENTS

| | | | |
|---|---|---|---|
| 8,023,408 B2* | 9/2011 | Herrmann | H04L 47/10 370/229 |
| 8,737,415 B2* | 5/2014 | Jonsson | H04L 1/1887 370/328 |
| 9,049,017 B2* | 6/2015 | Speight | H04L 1/1854 |
| 9,369,398 B2* | 6/2016 | Chan | H04L 45/741 |
| 9,438,517 B2* | 9/2016 | Chan | H04L 47/34 |
| 9,461,685 B2* | 10/2016 | Parron | H04B 1/3816 |
| 9,473,416 B2* | 10/2016 | Kanamarlapudi | H04L 47/2466 |
| 9,948,563 B2* | 4/2018 | Nadas | H04L 47/2408 |
| 10,111,190 B2* | 10/2018 | Pelletier | H04W 56/0045 |
| 2002/0087716 A1 | 7/2002 | Mustafa | |
| 2009/0318152 A1 | 12/2009 | Maheshwari | |
| 2011/0235630 A1* | 9/2011 | Hui | H04L 12/66 370/352 |
| 2012/0057462 A1 | 3/2012 | Kotecha et al. | |
| 2012/0269150 A1 | 10/2012 | Delorme et al. | |
| 2014/0219112 A1* | 8/2014 | Kherani | H04W 72/1242 370/252 |
| 2014/0226663 A1 | 8/2014 | Chan et al. | |
| 2015/0085759 A1* | 3/2015 | Gajula | H04W 72/02 370/329 |
| 2016/0066328 A1* | 3/2016 | Hu | H04W 72/1284 370/329 |
| 2017/0245178 A1* | 8/2017 | Nobukiyo | H04W 28/14 |

* cited by examiner

PRIORITIZING PACKETS IN WIRELESS COMMUNICATIONS

CLAIM OF PRIORITY UNDER 35 U.S.C. § 119

The present Application for Patent claims priority to Provisional Application No. 62/436,376, entitled "PRIORITIZING PACKETS IN WIRELESS COMMUNICATIONS" filed Dec. 19, 2016, which is assigned to the assignee hereof and hereby expressly incorporated by reference herein for all purposes.

BACKGROUND

Aspects of the present disclosure relate generally to wireless communication systems, and more particularly, to prioritizing packets in a wireless communication systems.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

For example, for 5G communications technology and beyond, communications may have tight timing constraints due to physical layer design, and as such, a UE may prebuild uplink packets for transmitting before an uplink resource grant is actually received from a base station. In previous technologies, some packets were prioritized, such as acknowledgement feedback packets, for transmission before certain data, which improved communication throughput. In 5G where packets are prebuilt, however, it may not be possible to insert priority packets ahead of the prebuilt packets for prioritized transmission without deciphering the packets, modifying sequence numbers, etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of transmitting data in wireless communications is provided. The method includes receiving a set of packets for transmission in a defined sequence, the set of packets including two or more packets, detecting that a packet, of the set of packets, is a prioritized packet type, prioritizing the packet for transmission ahead of its order in the defined sequence based on the detection of the prioritized packet type, and transmitting the packet ahead of its order in the defined sequence to an access point.

In another example, an apparatus for transmitting data in wireless communications is provided. The apparatus includes a transceiver for communicating one or more wireless signals via one or more antennas, a memory configured to store instructions, and one or more processors communicatively coupled with the transceiver and the memory. The one or more processors are configured to receive a set of packets for transmission in a defined sequence, the set of packets including two or more packets, detect that a packet, of the set of packets, is a prioritized packet type, prioritize the packet for transmission ahead of its order in the defined sequence based on the detection of the prioritized packet type, and transmit the packet ahead of its order in the defined sequence to an access point.

In another example, an apparatus for transmitting data in wireless communications is provided. The apparatus includes means for receiving a set of packets for transmission in a defined sequence, the set of packets including two or more packets, means for detecting that a packet, of the set of packets, is a prioritized packet type, means for prioritizing the packet for transmission ahead of its order in the defined sequence based on the detection of the prioritized packet type, and means for transmitting the packet ahead of its order in the defined sequence to an access point In another example, a computer-readable medium, including code executable by one or more processors for transmitting data in wireless communications is provided. The code includes code for receiving a set of packets for transmission in a defined sequence, the set of packets including two or more packets, code for detecting that a packet, of the set of packets, is a prioritized packet type, code for prioritizing the packet for transmission ahead of its order in the defined sequence based on the detection of the prioritized packet type, and code for transmitting the packet ahead of its order in the defined sequence to an access point In another example, a method of receiving packets in wireless communications is provided. The method includes receiving a plurality of protocol data units comprising packets transmitted by a user equipment (UE), determining a portion of the plurality of protocol data units that correspond to a priority packet, and separating the portion of the plurality of protocol data units from a remaining portion of the plurality of protocol data units for processing.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
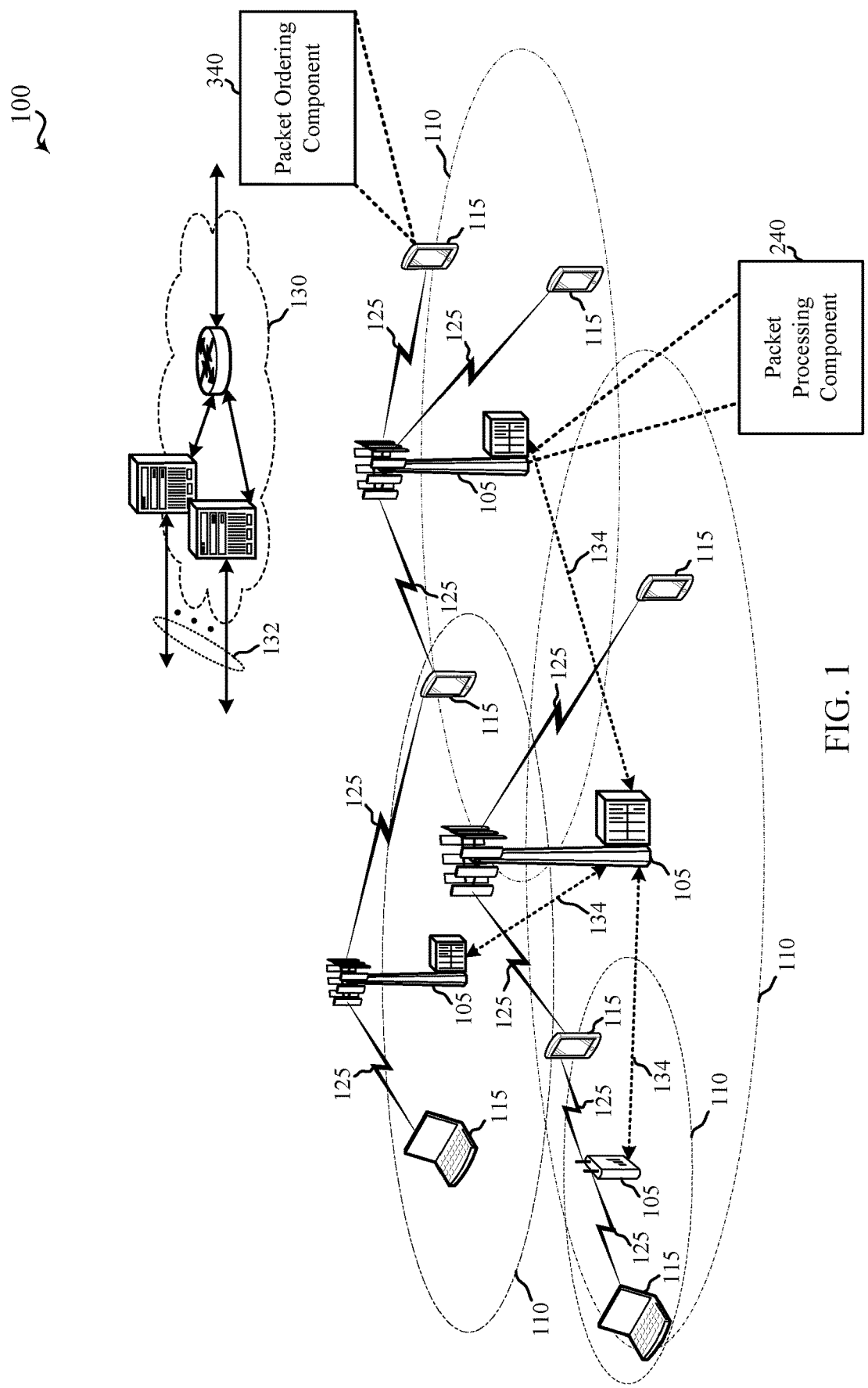
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to prioritizing certain packets for transmission within a set of packets ordered according to a defined sequence. For example, the certain packets to be prioritized may correspond to packets determined to have certain content and/or header information, packets of a priority packet type, packets related to a priority buffer or data radio bearer (DRB), etc. In one example, the packets to be prioritized can relate to feedback data, such as acknowledgement (ACK)/negative ACK (NACK) data, voice over internet protocol (VoIP) data, gaming traffic, real time communication traffic, etc. These priority packets can be prioritized over other packets, though the priority packets and other packets maybe otherwise ordered according to the defined sequence for transmitting in a wireless network, to decrease latency associated with the priority packets. Though the description refers to ACK/NACK data as priority data in various places, the functions and concepts described herein may be applicable to substantially any type of priority traffic. In one example, the priority packets may be prioritized in prebuilding associated protocol data units (PDUs), as described further herein. For example, an amount of packets prebuilt can control a queuing delay that the packets may by subject to before transmission.

In an example, prioritizing the packets can occur at a modem of a user equipment (UE). In one example, prioritizing the packets can include using a separate priority buffer for the packets to be prioritized over a buffer used for other packets (which can be referred to as the normal buffer). For example, the buffer can be at a layer at which PDUs are built or prebuilt for transmission. For example, prebuilding can refer to building PDUs for packets at the layer though an uplink grant is not yet received. Thus, when the uplink grant is received, the pre-built PDUs can be nearly immediately transmitted, which can improve efficiency over the uplink. In building or prebuilding the PDUs, at least some packets can be obtained from the priority buffer before obtaining packets from the normal buffer. In one example, to enable some level of prioritization, packets to be prioritized can be kept at or below a threshold number of packets. In another example, prioritizing the packets can also include using a separate priority DRB for the packets to be prioritized over a DRB used for other packets (which can be referred to as the normal DRB). In an example, packets from both DRBs can be built/prebuilt (e.g., in parallel), and separately transmitted from the separate DRBs.

In another example, a priority packet type can be defined for the priority packets at the layer where the packets are built/prebuilt. It is possible that the priority packet type may use a separate sequence numbering space than other packet types or no sequence numbering to allow a receiving base station to determine that the packet is a priority packet (e.g., and not an out-of-sequence data or control packet). In another example, where the priority packet shares the sequence numbering space with other packet types, the priority packet can have an indicator to not attempt reordering of the packet to allow the base station to process the priority packet without waiting for other packets having a lower sequence number.

In other examples, some sequence numbers can be reserved for priority packets and skipped when ordering non-priority data or control packets. Thus, even though packets are prebuilt, some sequence numbers can be skipped and used for associating with priority packets after prebuilding. In some cases, in this example, some sequence numbers do not get used if there is no priority data. In another example, sub-sequence numbers can be used for priority packets to allow insertion of priority packets in an ordered sequence of non-priority packets. In addition, the priority packets can be sent out of order, but placed in a transport block (TB) that minimize the impact of the out-of-order packets (e.g., at the end of a TB in a current transmission time interval (TTI) or a first TB of a next TTI). Still, in another example, the priority packets can be delayed to a next uplink grant where grants are provided at a high rate. In any case, transmission of the priority packets can be prioritized over non-priority packets even when packets are prebuilt. Moreover, though generally described herein as a UE prebuilding and transmitting packets to a base station or other access point, the base station (or access point) or substantially any wireless device can prebuild and/or transmit packets to the UE or substantially any other wireless device using the functions described herein.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In aspects of the wireless communication system 100, a base station 105 may include a packet processing component 240 (see e.g., FIG. 2) configured to process one or more packets received from one or more UEs, where PDUs forming the packets may include one or more prioritized packets. In other aspects of the wireless communication system 100, a UE 115 may include a packet ordering component 340 (see e.g., FIG. 3) configured to order one or more packets for transmitting to the base station 105, where the packets may include one or more prioritized packets. In some examples, the prioritized packets and/or corresponding PDUs may be prioritized over other packets or corresponding PDUs (e.g., regardless of a defined packet or PDU sequence), which may be achieved by using one or more of a separate priority buffer or DRB, a separate sequence number space, one or more sequence numbers reserved for priority packets, a last TB of a current TTI, a first TB of a next TTI, etc.

Figure 2:
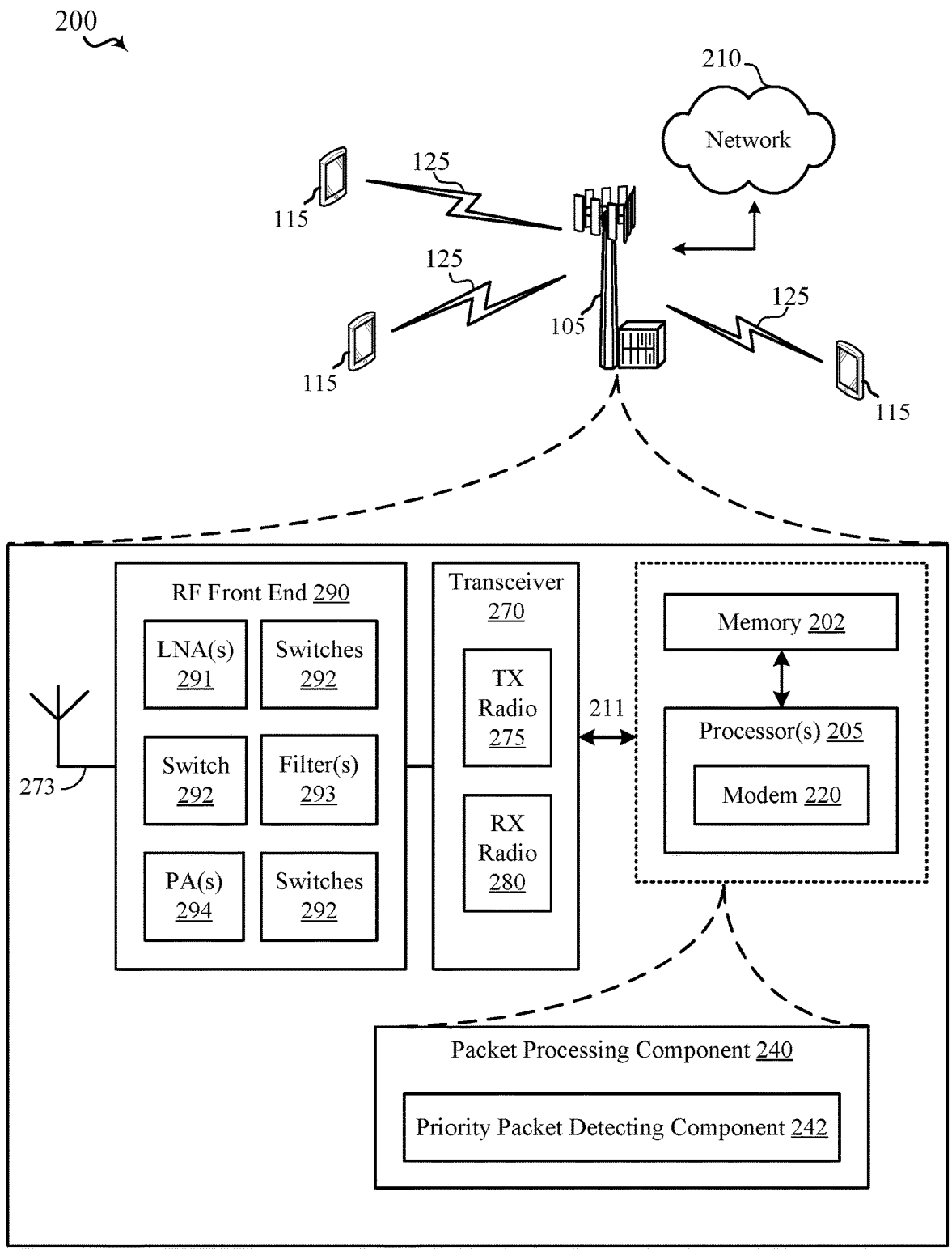
FIG. 2 is a block diagram illustrating an example of a base station, in accordance with various aspects of the present disclosure.
Figure 3:
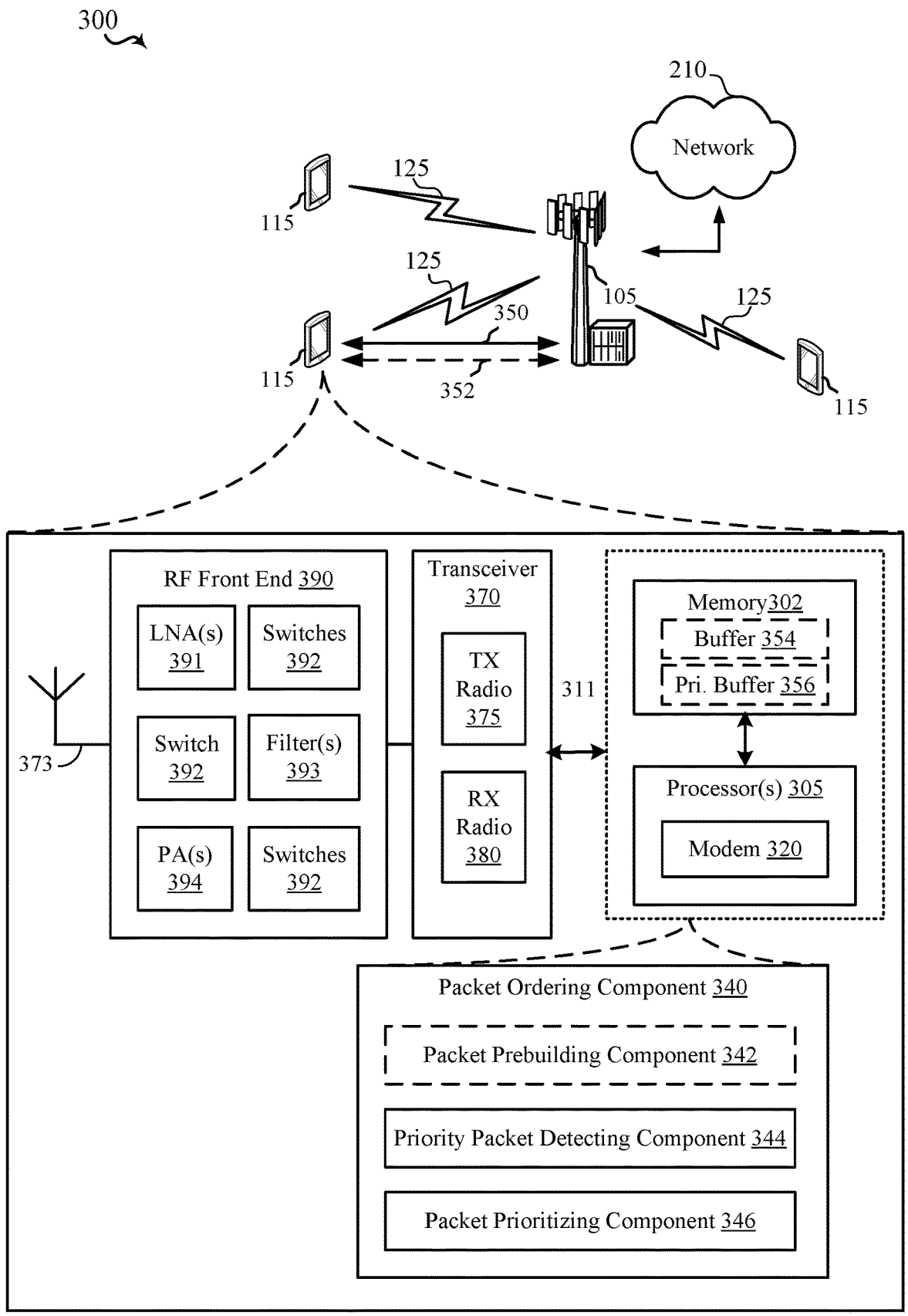
FIG. 3 is a block diagram illustrating an example of a UE, in accordance with various aspects of the present disclosure.
Figure 4:
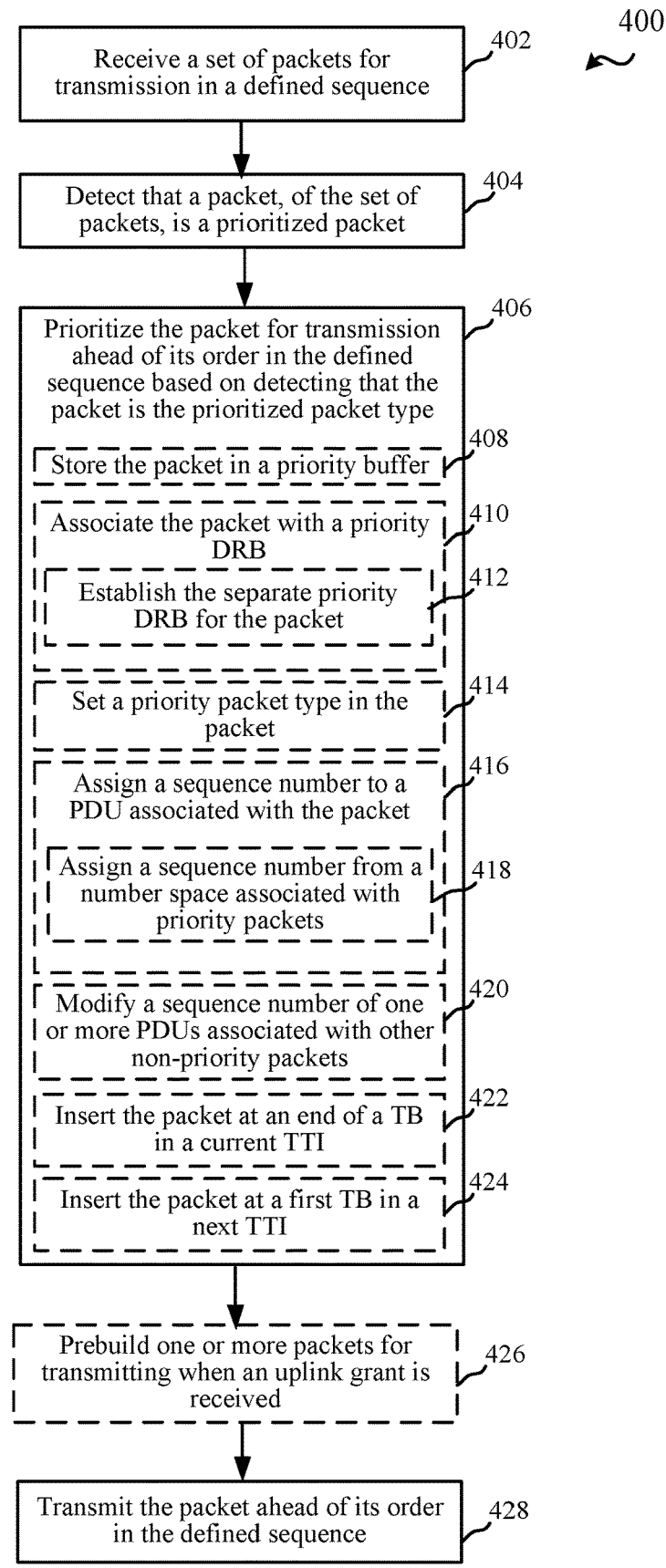
FIG. 4 is a flow chart illustrating an example of a method for transmitting packets, in accordance with various aspects of the present disclosure.
Figure 5:
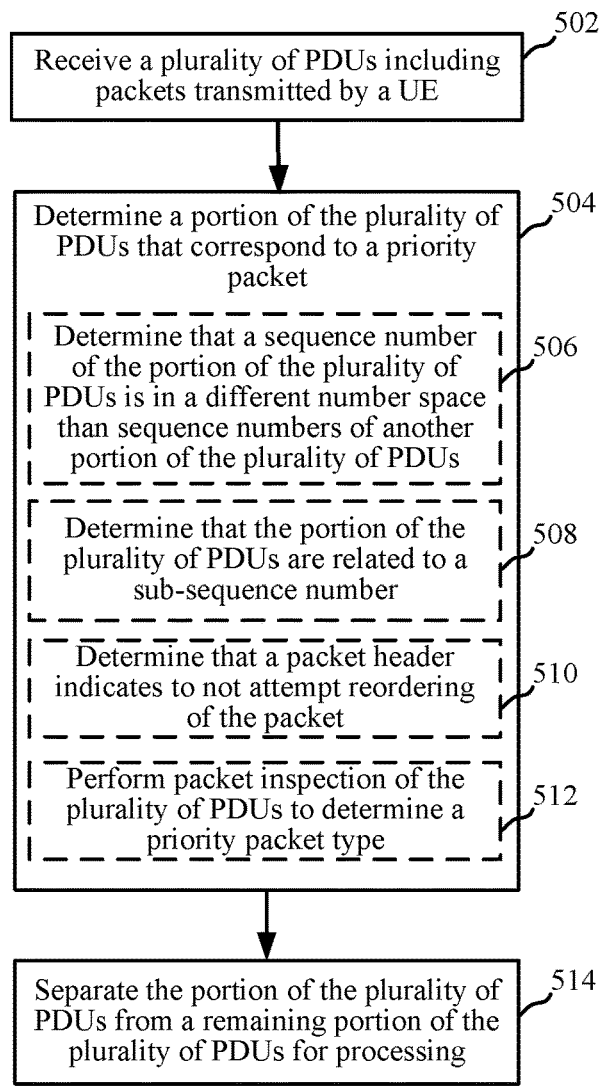
FIG. 5 is a flow chart illustrating an example of a method for receiving packets, in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, a block diagram 200 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to prioritize packets in generating PDUs for transmission to a base station. Moreover the base station 105 may be an example of the base stations described in the present disclosure (e.g., eNB, gNB, etc. providing one or more macrocells, small cells, etc.) that are configured to process received packets, which may include separately processing priority packets and non-priority packets.

In an aspect, the base station in FIG. 2 may include one or more processors 205 and/or memory 202 that may operate in combination with a packet processing component 240 to perform the functions, methods (e.g., method 500 of FIG. 5), etc., presented in the present disclosure. In accordance with the present disclosure, the packet processing component 240 may include a priority packet detecting component 242 for detecting a priority packet sent among non-priority packets.

The one or more processors 205 may include a modem 220 that uses one or more modem processors. The various functions related to the packet processing component 240, and/or its sub-components, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the packet processing component 240. In another example, packet processing component 240 may operate at one or more communication layers, such as a PDCP layer, an RLC layer, etc., to process packets or related PDUs received over the one or more communication layers.

In some examples, the packet processing component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to receive signals for, or transmit signals generated by, the packet processing component 240 to the UEs. RF front end 290 may be connected to one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels. In an aspect, the components of the RF front end 290 can connect with transceiver 270. The transceiver 270 may connect to one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or packet processing component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining packet processing component 240 and/or one or more of its sub-components. Additionally or alternatively, the base station 105 may include a bus 211 for coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 10. Similarly, the memory 202 may correspond to the memory described in connection with the base station in FIG. 10.

Referring to FIG. 3, a block diagram 300 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to prioritize packets in generating PDUs for transmission to a base station. Moreover the base station 105 may be an example of the base stations described in the present disclosure (e.g., eNB, gNB, etc. providing one or more macrocells, small cells, etc.) that are configured to process received packets, which may include separately processing priority packets and non-priority packets.

In an aspect, the UE 115 in FIG. 3 may include one or more processors 305 and/or memory 302 that may operate in combination with a packet ordering component 340 to perform the functions, methods (e.g., method 400 of FIG. 4), etc., presented in the present disclosure. In accordance with the present disclosure, the packet ordering component 340 may optionally include a packet prebuilding component 342 configured for prebuilding packets (e.g., into PDUs) before an uplink resource grant is received for transmitting the packets to a base station 105, a priority packet detecting component 344 for detecting a priority packet for communicating ahead of one or more ordered non-priority packets, and/or a packet prioritizing component 346 for prioritizing the priority packet ahead of the one or more ordered non-priority packets for transmitting to the base station 105.

The one or more processors 305 may include a modem 320 that uses one or more modem processors. The various functions related to the packet ordering component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the packet ordering component 340. In another example, packet ordering component 340 may operate at one or more communication layers, such as a PDCP layer, an RLC layer, etc., to process and/or prioritize packets or generate related PDUs over the one or more communication layers.

In some examples, the packet ordering component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to generate and/or transmit signals that include the packets (e.g., and/or one or more related PDUs) as generated by the packet ordering component 340. RF front end 390 may be connected to one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can connect with transceiver 370. The transceiver 370 may connect to one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or packet ordering component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining packet ordering component 340 and/or one or more of its sub-components. Additionally or alternatively, the UE 115 may include a bus 311 for coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 10. Similarly, the memory 302 may correspond to the memory described in connection with the UE in FIG. 10.

FIG. 4 illustrates a flow chart of an example of a method 400 for prioritizing (e.g., by a transmitter, such as a UE) packets for transmitting ahead of non-priority packets in an otherwise ordered sequence of packets.

At Block 402, the transmitter may receive a set of packets for transmission in a defined sequence. In an aspect, packet ordering component 340, e.g., in conjunction with processor(s) 305 and/or memory 302, can receive the set of packets for transmission in the defined sequence. For example, packet ordering component 340 may receive the set of packets from one or more applications executing on the transmitter (e.g., on UE 115), packets identified as relating to an evolved packet system (EPS) bearer for communicating to a network, and/or the like, and may operate at a communication layer for generating one or more PDUs corresponding to the packet (e.g., a PDCP layer, RLC layer, etc.). Thus, the packets may be associated with an order for transmitting by generating corresponding PDUs to have an associated sequence number. In an example, packet ordering component 340 can receive the packets as coming into a modem 320 of the UE 115. In any case, the sequence number can assist the receiver (e.g., base station 105), receiving the PDUs, in ordering the PDUs for decoding/processing packets communicated by the PDUs.

At Block 404, the transmitter can detect that a packet, of the set of packets, is a prioritized packet. In an aspect, priority packet detecting component 344, e.g., in conjunction with processor(s) 305 and/or memory 302, can detect that the packet, of the set of packets, is a prioritized packet. In one example, priority packet detecting component 344 can detect that the packet is a prioritized packet based on a contents of the packet, a header thereof, a flow over which the packet is received, etc. For example, priority packet detecting component 344 can detect that the packet corresponds to a certain application (e.g., VoIP) or type of packet (e.g., a feedback packet, such as an ACK/NACK packet, etc.), and may accordingly determine that the packet is to be prioritized for transmission over other received packets. Thus, in an example, a packet classifier (e.g., priority packet detecting component 344) can perform packet inspection on the packet and/or a header thereof to determine that the packet is of a type that can be prioritized. In another example, priority packet detecting component 344 can detect the priority of the packets based on a queue or flow over which the packet is received (e.g., a feedback queue can be prioritized over a normal data flow, as described above and further herein).

At Block 406, the transmitter can prioritize the packet for transmission ahead of its order in the defined sequence based on detecting that the packet is the prioritized packet type. In an aspect, packet prioritizing component 346, e.g., in conjunction with processor(s) 305 and/or memory 302, can prioritize the packet for transmission ahead of its order in the defined sequence based on detecting that the packet is the prioritized packet type. Thus, the transmission of the packet can be prioritized in this regard, though the packet may (or may not) have an associated priority behind other packets, such as a sequence number, which may include a lower layer sequence number as described in some examples herein. Prioritizing the packet can be based on a number of different mechanisms, as described further herein.

For example, in prioritizing the packet at Block 406, the transmitter may, at Block 408, store the packet in a priority buffer (e.g., by adding the packet to the priority buffer). In an aspect, packet prioritizing component 346, e.g., in conjunction with processor(s) 305 and/or memory 302, can store the packet in the priority buffer 356. For example, packet prioritizing component 346 can establish the separate priority buffer 356 in memory 302, where memory 302 may also include a normal buffer 354 for storing other packets for generating PDUs for transmitting the packets over a DRB. Thus, in this example, the DRB can have a normal buffer 354 for the non-prioritized packets and a priority buffer 356 for prioritized packets. When packets are built/prebuilt or otherwise transmitted, as further described herein, packet ordering component 340 can select packets for building/transmitting associated PDUs, where selection can occur from the priority buffer 356 or normal buffer 354 based on a selection process. For example, the selection process may include selecting all packets in the priority buffer 356 before selecting packets in the normal buffer 354, selecting a ratio or order of packets from the priority buffer 356 and normal buffer 354 (e.g., selecting 1 packet from the priority buffer followed by two packets from the normal buffer followed by 1 packet from the priority buffer, and so on), selecting packets according to a token bucket scheme where one or more of the priority buffer 356 or normal buffer 354 are associated with tokens that are redeemed when packets are selected, etc. Thus, at least some control of uplink/downlink throughput can be provided in this regard.

Figure 6:
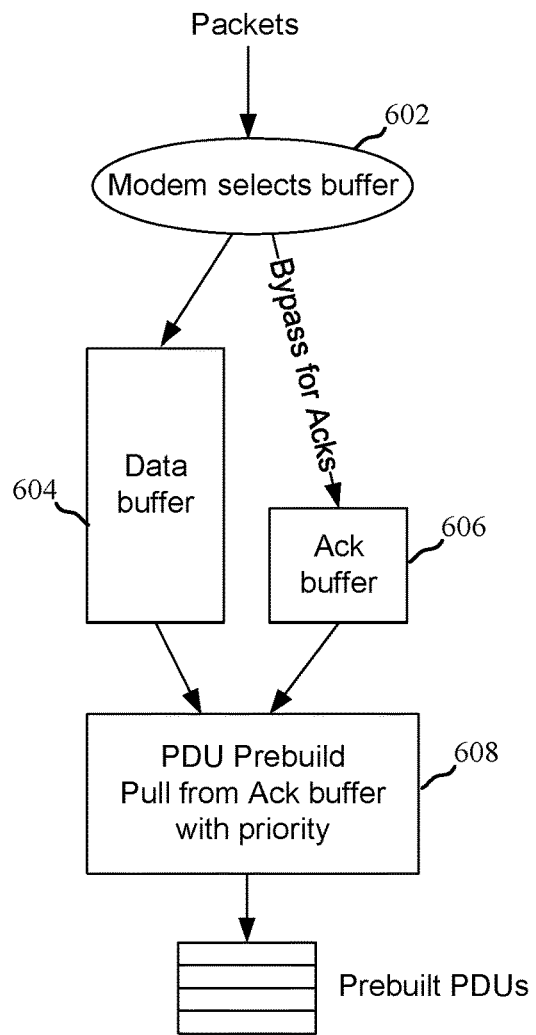
FIG. 6 is a diagram illustrating an example of a data flow of packets to separate buffers for prebuilding protocol data units (PDUs) in accordance with various aspects of the present disclosure.

A specific example is shown in FIG. 6, which illustrates a dataflow 600 of packets to lower communication layers (e.g., a PDCP layer) for pre-building associated PDUs for transmission. In dataflow 600, packets can be received (e.g., from an application layer or other upper layer), and at 602, the modem selects a buffer for a given packet from among a data buffer 604 or an ACK buffer 606 (or other prioritized buffer for prioritized packets). As described, for example, packet prioritizing component 346 (e.g., in conjunction with transceiver 370 or other RF front end 390 components) can prioritize packets based on at least one of performing inspection of the packet and/or a corresponding header to determine a type of data in the packet, determining an application or associated queue from which the packet is received, etc. As described in further detail below, a packet prebuilding component 342 can then pull packets from the ACK buffer 606 before packets from the data buffer 604 in prebuilding corresponding PDUs at 608 (e.g., for a single DRB). As described, this can include pulling all packets from the ACK buffer 606 first, pulling packets from the ACK buffer 606 at a ratio to the data buffer 604, pulling packets from the ACK buffer 606 and/or data buffer 604 using a token mechanism (e.g., pull until no more tokens are left or using a portion of available tokens, etc.), and/or the like. In any case, priority is provided to the ACK buffer 606 to lower latency associated with corresponding packets.

In another example, in prioritizing the packet at Block 406, the transmitter may, at Block 410, associate the packet with a priority DRB. In an aspect, packet prioritizing component 346, e.g., in conjunction with processor(s) 305 and/or memory 302, can associate the packet with the priority DRB. For example, packet prioritizing component 346 can establish the separate priority DRB 352 with the base station 105, where UE 115 and base station 105 may also include a normal DRB 350 that has been established for communicating control and/or data between the UE 115 and base station 105. Thus, in this example, packet prioritizing component 346 can generate PDUs for the priority packet, and can associate the PDUs with the priority DRB 352 for transmitting to the base station 105, while associating other PDUs of other packets (e.g., control and data packets) for transmitting over the normal DRB 350. In addition, in an example, packet prioritizing component 346 may also utilize a separate priority buffer for the prioritized packets, as described above, and may associate PDUs built from packets from the priority buffer with the priority DRB 352 for transmitting to the base station 105. In an example, building/prebuilding of the PDUs for the packets, as described further herein, may be performed for the DRBs 350, 352 in parallel, and prioritization for the DRBs 350, 352 can occur based on receiving a grant of uplink resources. In any case, the base station 105 can receive the priority and non-priority packets over the separate DRBs 350, 352, and may accordingly separately process the packets as received (e.g., and/or based on corresponding sequence numbers, which may be in different number spaces for a given DRB).

In an example, in (or before) associating the packet at Block 410, the transmitter may, at Block 412, establish (or request to establish) the separate priority DRB for the packet. In an aspect, packet prioritizing component 346, e.g., in conjunction with processor(s) 305, memory 302, and/or transceiver 370, can establish the separate priority DRB 352 for the packet. For example, packet prioritizing component 346 can establish the priority DRB 352 using radio resource control (RRC) signaling or other protocol to request creation of the priority DRB 352. For example, packet prioritizing component 346 can establish the priority DRB 352 as a secondary DRB to DRB 350, which may be both mapped to one EPS bearer. In this regard, it may be understood that the traffic received over the corresponding DRBs 350, 352 may be merged at some point by the base station 105 (e.g., or network or other receiver). Moreover, the DRBs 350, 352 can use different sequence numbers, as described, to enable insertion of traffic from the priority DRB 352 ahead of traffic prebuilt for DRB 350.

In an example, packet prioritizing component 346 can establish or request to establish the priority DRB 352 at any time and/or based at least in part on at least one of detecting the packet at Block 404, determining a quality of service (QoS) of the DRB 350 or associated EPS bearer, discovering that priority packets (e.g., ACK/NACK feedback, VoIP traffic, or other packets determined to be priority packets) share the DRB 350 with other high throughput traffic (e.g., uplink TCP), etc. In one example, packet prioritizing component 346 can discover the priority packets in the DRB 350 based at least in part on an IP packet size or type (e.g., a smaller packet size for ACK/NACK feedback), absence of a user payload, presence of an increased ACK sequence number compared to the previous packets, etc.

In another example, packet prioritizing component 346 can create additional DRBs for additional traffic related to the EPS bearer, and may associate PDUs corresponding to packets of differing priorities with one of the DRBs. In an example, packet prioritizing component 346 can utilize a filter, such as a traffic flow template (TFT), to associate the PDUs with the appropriate DRB. In addition, in an example, packet prioritizing component 346 can determine that the priority DRB 352 is not needed, and may tear down the DRB 352 with base station 105.

Figure 7:
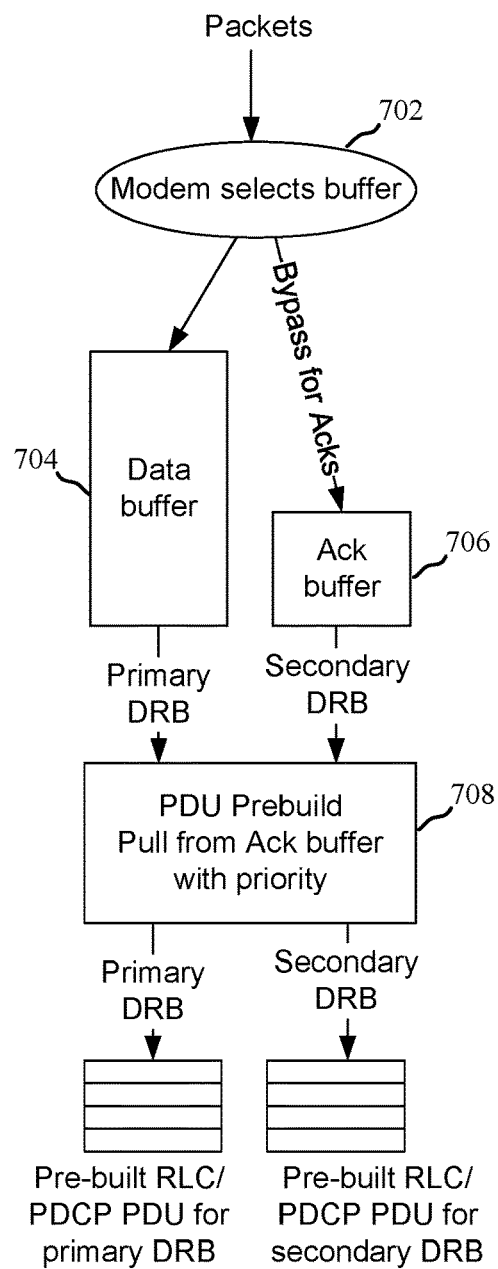
FIG. 7 is a diagram illustrating an example of a data flow of packets to separate buffers and data radio bearers (DRBs) for prebuilding protocol data units (PDUs) in accordance with various aspects of the present disclosure.

A specific example is shown in FIG. 7, which illustrates a dataflow 700 of packets to lower communication layers (e.g., a PDCP layer) for pre-building associated PDUs for transmission. In dataflow 700, similarly to dataflow 600, packets can be received (e.g., from an application layer or other upper layer), and at 702, the modem selects a buffer for a given packet from among a data buffer 704 or an ACK buffer 706 (or other prioritized buffer for prioritized packets). As described, for example, packet prioritizing component 346 (e.g., in conjunction with transceiver 370 or other RF front end 390 components) can prioritize packets based on at least one of performing inspection of the packet and/or a corresponding header to determine a type of data in the packet, determining an application or associated queue from which the packet is received, etc. As described in further detail below, a packet prebuilding component 342 can then pull packets from the ACK buffer 706 before packets from the data buffer 704 in prebuilding corresponding PDUs at 708. In this example, packet prebuilding component 342 can push the ACK packets onto a secondary DRB (e.g., a priority DRB) for prebuilding into PDCP PDUs for the secondary DRB, and/or can push data packets onto a primary PRB for prebuilding into PDCP PDUs for the primary DRB. Priority is provided to the ACK buffer 706 to lower latency associated with corresponding packets by packet ordering component 340 taking PDUs from the secondary DRB before PDUs from the primary DRB (e.g., by taking all PDUs from the secondary DRB first, by taking PDUs from the secondary DRB in a ratio to those of the first DRB, by using a token scheme, etc.).

In another example, in prioritizing the packet at Block 406, the transmitter may, at Block 414, set a priority packet type in the packet. In an aspect, packet prioritizing component 346, e.g., in conjunction with processor(s) 305 and/or memory 302, can set the priority packet type in the packet. In an example, packet prioritizing component 346 can set the priority type in a header of the packet or one or more corresponding PDUs, a container utilized for the packet, etc. For example, packet prioritizing component 346 can utilize a separate priority packet type defined by the communication layer to indicate priority packets, and the priority packets may use a separate sequence number space than the other non-priority (e.g., data) packet type, may not use sequence numbering, or may use the same sequence number space.

For example, when a separate sequence numbering is used, packet prebuilding component 342 may have prebuilt 3 PDUs for control and data type packets with sequence number (SN) 124, 125, 126. Then, based on detecting a priority packet, packet prioritizing component 346 can build or prebuild a priority PDU for the priority packet with SN 887. In this example, packet ordering component 340 may deliver PDUs to a lower layer (e.g., an RLC layer) with SN 887, 124, 125, and thus SN 887 may be out of sequence relative to the order observed of the packets received at Block 402. To avoid using the same key and SN twice, either a separate key or another initialization vector may be used for assigning SNs to the priority packets. For instance, a cipher bearer identifier can be generated based on a logical channel identifier concatenated with subflow identifier, where the priority packet can correspond to a different logical channel and/or subflow than other non-priority packets. Alternatively, a subset of the available sequence number space can be allocated to non-priority packets and the remaining space may be allocated to priority packets. In either case, a base station, or other entity receiving the PDUs, can determine that out-of-order PDUs can correspond to priority PDUs, or otherwise differentiate PDUs corresponding to priority packets from PDUs corresponding to non-priority packets, for the purpose of interpreting the priority PDUs out-of-order. Additional examples for handling the out of sequence priority packets are described herein.

When no sequence numbering is used for priority packets, packet prebuilding component 342 may not cipher the priority packets when prebuilding packets for transmission, as described further herein. Since there is no SN for these packets, the base station 105 or other receiver receiving the packets may not perform the reordering of priority packets. This may be compatible with the TCP flow control mechanism as well as other transport protocols. The TCP endpoint may not be impacted by receiving certain priority packets (e.g., ACKs) in the order 2, 4, 6 or 6, 4, 2. In particular, the fast retransmit behavior at the TCP endpoint associated with receiving duplicate ACKs may not trigger. The flow control that relies upon reception of ACK to increase the window may differentiate receiving ACK for an already acknowledged SN (e.g. receiving ACK SN=4 after receiving ACK SN=6), or may simply count the received ACK as a valid ACK.

Where the sequence number space is shared between priority and non-priority packets, the following behavior can be defined. For example, UE 115 may not be constrained to transmit PDCP packets in order. Thus, where priority packet detecting component 344 detects a priority packet, it can be given a next SN and sent before packets with lower SN, so it can be prioritized without impacting pipelining of existing flows. Packet prioritizing component 346 can set a PDCP header for the priority packet with an indicator specifying not to reorder the packet as the packet was actually transmitted out of order (e.g., to instruct the receiver to not wait for lower SN packets before processing and delivering to upper layers). This may be indicated using a flag or reusing flow ID mapping in the header. Accordingly, the base station 105 or other receiver can receive the PDU, and can forward to the next layer without waiting for packets with a lower SN than the priority packet, based on the indicator to allow the prioritized packet to be processed.

In another example, multiple priority packet types can be defined for multiple different priority levels, and packet prioritizing component 346 can select a priority type for a given packet. Packet prioritizing component 346, for example, can map a packet to a given flow that corresponds to the priority level, and can indicate a flow identifier within the DRB (e.g., DRB 350 or 352 if available). The transmitter may request creation of additional flows from the receiver, or the transmitter may autonomously start using some subflow identifiers, as an implicit indication the subflow is being used. Similarly to the priority level, a separate PDCP sequence numbering may be used for each flow identifier, which may allow for moving later packets from a higher priority flow to the head of the line, as sequence numbers in the priority space can be differentiated (e.g., by a receiver) from sequence numbers in the non-priority space. In addition, for example, a single PDCP sequence number space may be used for the multiple priority levels. In any case, the base station 105 can receive the PDUs in the multiple flows, and can accordingly process the packets with or without reordering based on using different sequence number spaces or based on an indication not to order certain PDUs (e.g., of priority packets) that may be indicated in the header.

In an example, in prioritizing the packet at Block 406, the transmitter may, at Block 416, assign a sequence number to a PDU associated with the packet. In an aspect, packet prioritizing component 346, e.g., in conjunction with processor(s) 305 and/or memory 302, can assign the sequence number to the PDU associated with the packet. As described above, this may include assigning sequence numbers associated with a priority packet type assigned to the packet, which may be of a same or different number space than that of other non-priority packets. In another example, however, packet prioritizing component 346 can assign the sequence number with or without assigning a priority packet type to the packet (e.g., the packet header, PDU, etc.).

In an example, in assigning the sequence number at Block 416, the transmitter may, at Block 418, assign a sequence number from a number space associated with priority packets. In an aspect, packet prioritizing component 346, e.g., in conjunction with processor(s) 305 and/or memory 302, can assign the sequence number from the number space associated with the priority packets. For instance, certain sequence numbers in the number space may be reserved for the priority packets, and these sequence numbers may be known by the UE 115 and base station 105. Accordingly, packet prioritizing component 346 can assign the reserved sequence numbers to priority packets if priority packets are detected by the priority packet detecting component 344. In a specific example, packet ordering component 340 may skip some PDCP SNs in ordering PDUs corresponding to non-priority packets (e.g., for prebuilding) to leave room for putative higher priority packets arriving after the time of prebuilding. For instance, the gaps can be located at certain intervals (e.g., defined by a value G configured at the UE 115 and base station 105, such that SN mod G=0 can be identified as a SN used for priority packets). In some examples, however, this may result in some SNs not being used (and the SN gap remaining) if no priority packets are available when SNs around the priority SNs are being used. As the receiver (e.g., base station 105) knows the priority SNs, however, it can assume (e.g., after a period of time) that a certain SN is not used.

Figure 8:
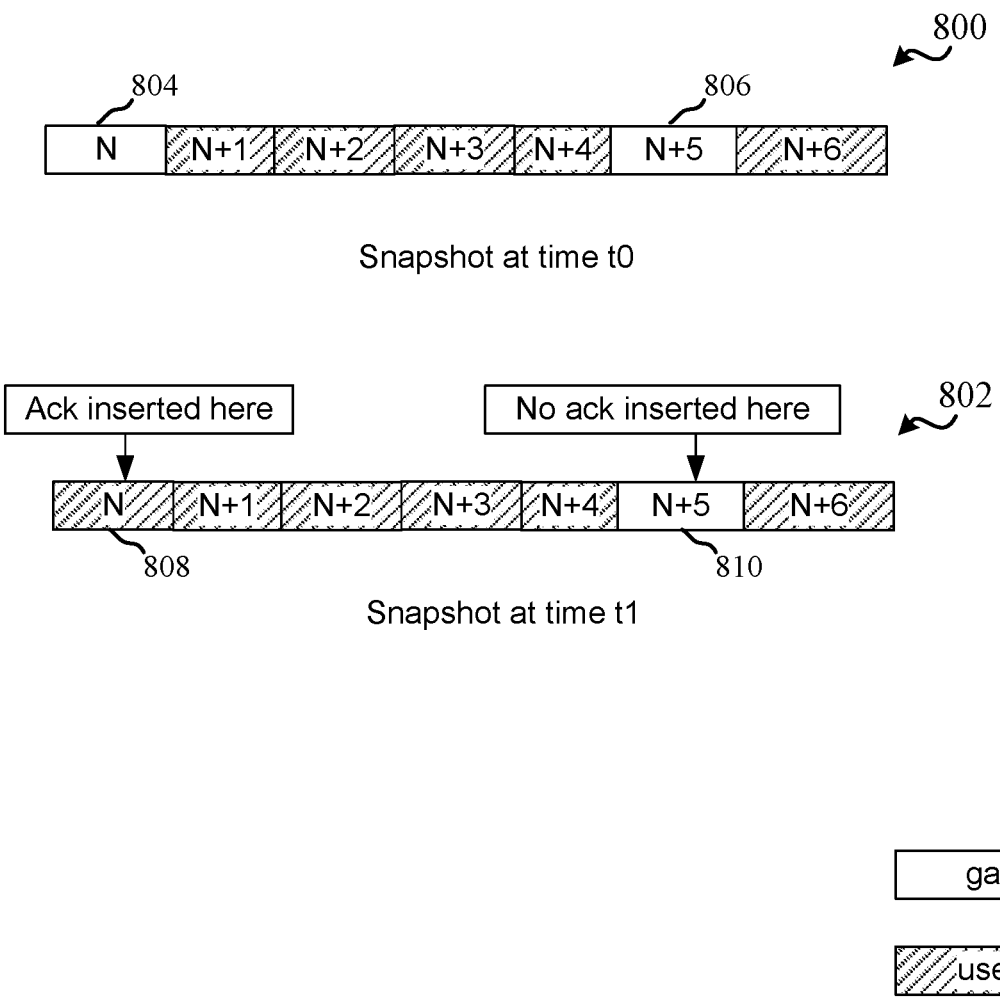
FIG. 8 is a diagram illustrating example snapshots in time of sequence numbering used for PDUs in accordance with various aspects of the present disclosure.

A specific example is shown in FIG. 8, which illustrates snapshots 800, 802 of sequence numbers used for prebuilding PDUs. In this example, as shown in snapshots 800, 802, every fifth sequence number can be gapped for inserting a PDU corresponding to a priority packet. In an example, the UE 115 and base station 105 can be aware of this configuration (e.g., via hardcoded configurations, base station 105 or other network entity configuration the UE 115 to utilize this pattern, etc.). Thus, in snapshot 800, PDU SNs N and N+5 are gapped for possible insertion of PDUs corresponding to priority packets, while SNs N+1, N+2, N+3, N+4, and N+6 are used for prebuilding PDUs correspond to non-priority packets. At snapshot 802, which can occur at a different time than snapshot 800, a priority packet is available (e.g., in a priority packet buffer or DRB, as described above), and a priority PDU can be prebuilt and inserted into the first available SN gap at SN N 808. SN N+5 810 of snapshot 802 may not have an associated priority PDU and may remain gapped. The receiver (e.g., base station 105) can process PDUs in the gapped SNs 804, 806, 808, 810 as priority PDUs separately from PDUs using the remaining SNs.

Figure 9:
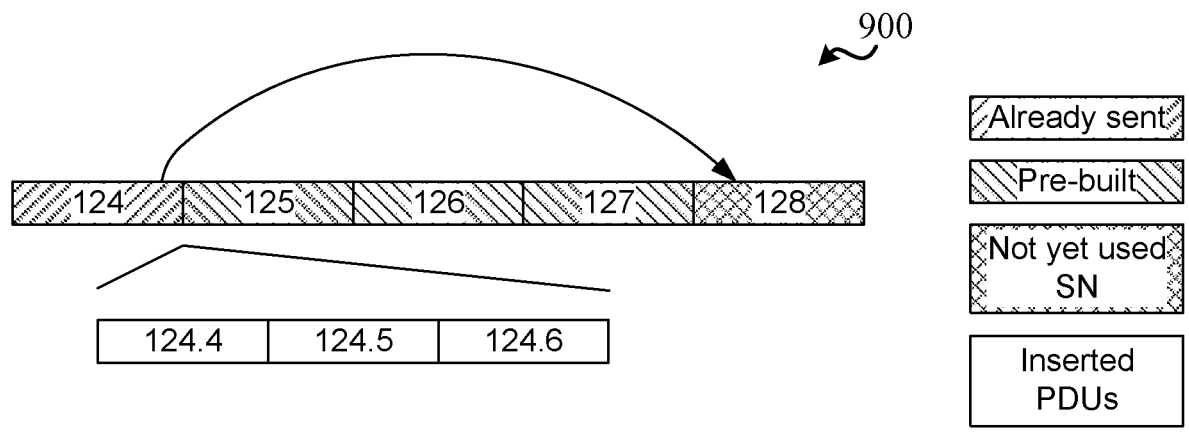
FIG. 9 is a diagram illustrating example snapshots in time of sequence numbering and sub-sequence numbering used for PDUs in accordance with various aspects of the present disclosure.

In another example, packet prioritizing component 346 can assign sub-sequence numbers to priority packets to allow for prioritizing the corresponding PDUs over non-priority PDUs. A specific example is shown in FIG. 9, which illustrates a snapshot 900 of sequence numbers used for prebuilding PDUs. For example, if the UE 115 already transmitted a PDU with SN 124, packet prebuilding component 342 has prebuilt PDUs with SNs 125, 126, 127, and a priority packet is detected, packet prioritizing component 346 can associate one or more priority PDUs for the priority packet with SN 124 to indicate the ordering with respect to the main PDCP sequence numbering, and then also indicate a sub-sequence number (SSN) to indicate a sequence of one or more priority packets inserted into the PDCP stream. In one example, packet prioritizing component 346 may utilize a header field of the PDU to indicate the sub-sequence number. In any case, the SSN can allow for using variable size positions for transmitting priority packets in a PDCP stream.

In addition, for example, packet prioritizing component 346 may select SSNs to indicate a sequence number not yet used (e.g., a sequence number occurring after sequence numbers for prebuilt PDUs), and then packet ordering component 340 can skip the sequence numbers indicated by SSN in subsequently prebuilding packets. For example, packet prioritizing component 346 can set SN to the highest transmitted SN (e.g., 124 in the example above), and then set SSN such that SN+SSN is equal to the first PDCP SN not yet used for ciphering considering prebuilt packets (e.g., 4 in the example above, and as illustrated in FIG. 9, since 124+4=128, which is not yet used in the prebuilt packets). Packet prioritizing component 346 can then increment the SSN for each subsequent PDU corresponding to the one or more priority packets. Thus, packet prioritizing component 346 can set SN 124 and SSN 4, 5, 6, etc. for PDUs corresponding to one or more priority packets. Packet prebuilding component 342 can accordingly continue sequence numbering for prebuilt packets at the sequence number after the last transmitted SSN (e.g., where SSNs 4, 5, 6, are transmitted, sequence numbering can continue at 124+6+1=131, and sequence numbers 128, 129, 130 are not used, other than for the packets with SN 124 and SSN 4, 5, and 6). The base station 105 can include similar logic, as described below, to properly decode and process the PDUs. In another example, packet prioritizing component 346 can use the legacy PDCP SN for ciphering/deciphering, and add a second field in the PDCP header to indicate the desired delivery position. In the example above, packet prioritizing component 346 can set the legacy PDCP SN to 128 and the delivery position PDCP SN to 124 or 125. This can enable the base station 105 to deliver the PDU to a higher layer (e.g., IP layer) without waiting for reception of SNs 125-127 for reordering.

In another example, packet prioritizing component 346 can use the same ciphering key for the priority packets at the SSN that would be (or is) used for the corresponding SN by packet ordering component 340. This can allow packet prioritizing component 346 to use SSNs starting at 1 (or 0 or some other starting index) (e.g., 124.1, 124.2, etc.) regardless of what PDUs are used in prebuilding. In this example, packet prioritizing component 346 can use the same ciphering key for the SSNs as is used for the corresponding SNs (e.g., by packet prebuilding component 342). For example, packet prioritizing component 346 can use the same ciphering key for 124.1 as is used for 125, the same ciphering key for 124.2 as is used for 126, etc., which can enable the receiver (e.g., base station 105) to decipher the priority packets using the same key as the non-priority packets.

In an example, in assigning the sequence number at Block 416, the transmitter may, at Block 420, modify a sequence number of one or more PDUs associated with other non-priority packets. In an aspect, packet prioritizing component 346, e.g., in conjunction with processor(s) 305 and/or memory 302, can modify the sequence number of one or more PDUs associated with other non-priority packets. Thus, for example, packet prioritizing component 346 may decipher prebuilt, but not transmitted, PDUs, modify the sequence number to allow inserting PDU(s) of a priority packet, and recipher the PDUs with the modified sequence numbers. Alternatively, in an example, the packet prioritizing component 346 may recipher using the original packet in clear.

In another example, packet prioritizing component 346 can modify the lower layer sequence number (e.g., RLC SN) of one or more pre-built PDUs associated with lower priority packets. For example, packet prioritizing component 346 can adjust the RLC SNs of nonpriority packets to allow insertion of one or more priority packet PDUs in the sequence. For instance, RLC can use a separate sequence numbering than PDCP, thus if RLC pre-building is used, and without changing RLC, the receiver (e.g., base station 105) can experience out of order reception, as the prioritized PDCP PDU (e.g., for the priority packet) appears earlier than pre-built RLC PDUs containing non-priority PDCP PDUs. This can be addressed by packet prioritizing component 346 adjusting the RLC SN after the insertion of the PDCP PDUs corresponding to the priority packet. Alternatively, packet ordering component 340 may not assign the RLC SN until the transmission time. This may be possible since the content of the RLC layer PDU is not dependent on the value of the SN. Alternatively, to avoid re-numbering, the RLC layer, similar to PDCP layer as desired, may define a priority packet type or subflow which runs its own sequence number (e.g., in a separate sequence number space) independent of the other sequence numbers.

In an example, in assigning the sequence number at Block 416, the UE may, at Block 422 insert the packet at an end of a TB in a current TTI. In an aspect, packet prioritizing component 346, e.g., in conjunction with processor(s) 305 and/or memory 302, can insert the packet at the end of the TB in the current TTI. In this example, The PDCP SN and RLC SN of the priority packets can be consistent with their position in the TB, so that there is no out-of-order within this TB. As a result, any other pre-built/fetched/ciphered PDUs behind the priority packets may have to be re-built/fetched/ciphered. However, the number of affected packets might be smaller or zero, and such work might be done outside the critical transmission timeline for NR or other communications technologies, as it pertains to transmissions in future slots.

In another example, in assigning the sequence number at Block 416, the transmitter may, at Block 424 insert the packet at a first TB in a next TTI. In an aspect, packet prioritizing component 346, e.g., in conjunction with processor(s) 305 and/or memory 302, can insert the packet at the first TB in the next TTI. In this approach, if the packet prioritizing component 346 detects an uplink grant rate over a threshold (e.g., a rate at which a number of previous uplink grants are received, such as within a period of time, achieves the threshold), this can be indicative of a low network loading, high user priority, or a lab test, and the packet prioritizing component 346 can accordingly delay the priority packet until the next uplink grant. In some examples, the UE 115 may be likely to not be suddenly starved of uplink grants, and the priority packet can go in the beginning of the next TTI. In case where the UE 115 is suddenly starved for uplink grants, this may indicate that the network is congested, or the UE crossed its data usage threshold, or the test is discontinued.

In an example, at Block 426, the transmitter can optionally prebuild one or more packets for transmitting when an uplink grant is received. In an aspect, packet prebuilding component 342, e.g., in conjunction with processor(s) 305 and/or memory 302, can prebuild the one or more packets for transmitting when the uplink grant is received. As described above, packet prebuilding component 342 can prebuild packets from a buffer and/or a separate priority buffer. In another example, packet prebuilding component 342 can prebuild packets for DRBs 350, 352 in parallel. Further, for example, packet prebuilding component 342 can prebuild packets that do not correspond to priority packets, and one or more sequence numbering mechanisms can be used, as described above, to insert priority packet PDUs.

In an example, at Block 428, the transmitter can transmit the packet ahead of its order in the defined sequence. In an aspect, packet ordering component 340, e.g., in conjunction with processor(s) 305, memory 302, and/or transceiver 370, can transmit the packet ahead of its order in the defined sequence. As described, packet ordering component 340 can provide the packet ahead of other packet PDUs for transmitting based on obtaining the packet from a separate buffer or DRB, using a priority packet type to indicate a priority for inserting the packet, using sequence numbering to insert the packet, etc.

FIG. 5 illustrates a flow chart of an example of a method 500 for processing (e.g., by a receiver, such as a base station) priority and non-priority packets received from one or more transmitters.

In method 500, at Block 502, the receiver can receive a plurality of PDUs including packets transmitted by a UE. In an aspect, packet processing component 240, e.g., in conjunction with processor(s) 205, memory 202, and/or transceiver 270, can receive the plurality of PDUs including packets transmitted by the UE 115 (or other transmitter). For example, packet processing component 240 can receive the PDUs from a lower layer, such as an RLC layer, where the PDUs can form one or more packets. In one example, the UE 115 can prioritize certain packets for transmitting before other non-priority packets, and the base station 105 may include logic for determining the priority packets, which can assist in determining whether PDUs received out-of-order correspond to priority packets (in which case the receiver can decode the PDUs) or non-priority packets (in which case the receiver may wait for a missing PDU before decoding).

For example, at Block 504, the receiver can determine a portion of the plurality of PDUs that correspond to a priority packet. In an aspect, priority packet detecting component 242, e.g., in conjunction with processor(s) 205 and/or memory 202, can determine the portion of the plurality of PDUs that correspond to the priority packet. In one example, priority packet detecting component 242 can determine the priority packets based on determining a DRB 350, 352 over which the packets are received.

In another example, in determining the PDUs corresponding to priority packets at Block 504, the receiver may, at Block 506, determine that a sequence number of the portion of the plurality of PDUs is in a different number space than sequence numbers of another portion of the plurality of PDUs. In an aspect, priority packet detecting component 242, e.g., in conjunction with processor(s) 205 and/or memory 202, can determine that the sequence number of the portion of the plurality of PDUs is in a different number space than sequence numbers of another portion of the plurality of PDUs. As described, the transmitter (e.g., UE 115) can use different sequence number spaces for the priority packets and non-priority packets. Accordingly, priority packet detecting component 242 can determine the sequence number space of the non-priority packets, and can notice when a packet is received that it is in a different number space (e.g., at least a threshold different than a previously received sequence number, using a different key value that the previously received sequence number, etc.), and can accordingly determine the packet is a priority packet. In another example, the different number space may include a determinable portion of the number space (e.g., a sequence number occurring at an interval based on a value, G, such that SN mod G=0 indicates a sequence number for a priority packet PDU, a subset of numbers such as numbers having a most significant bit of 1 for priority packet PDUs, etc.).

In another example, in determining the PDUs corresponding to priority packets at Block 504, the receiver may, at Block 508, determine that the portion of the plurality of PDUs are related to a sub-sequence number. In an aspect, priority packet detecting component 242, e.g., in conjunction with processor(s) 205 and/or memory 202, can determine that the portion of the plurality of PDUs are related to the sub-sequence number. For example, as described, that packet header can indicate the sub-sequence number, and where a sub-sequence number is identified, priority packet detecting component 242 can detect the packet as a priority packet. Moreover, as described, packet processing component 240 can utilize the sub-sequence number to determine a next sequence number for ordering received non-priority packets (e.g., packets not having an associated sub-sequence number). In this example, for reordering purposes, priority packet detecting component 242 may consider the position of this PDU is between SN and SN+1. Within that gap, priority packet detecting component 242 can order PDUs according to SSN. In one example, the first PDU may have one bit in header to indicate "first sub-SN." In the example above, described in conjunction with FIG. 9, PDU with SN+SSN 124.4 can have this bit set. This can allow the priority packet detecting component 242 to provide ordered delivery within the sub-sequence numbering space. Additionally, as described, in subsequently reordering packets, packet processing component 240 may assume that sequence number(s) SN+SSN have been received (e.g., 128, 129, 130, in the above example), and can expect to receive the next SN (e.g., 130 in the above example).

In another example, in determining the PDUs corresponding to priority packets at Block 504, the receiver may, at Block 510, determine that a packet header indicates to not attempt reordering of the packet. In an aspect, priority packet detecting component 242, e.g., in conjunction with processor(s) 205 and/or memory 202, can determine that the packet header indicates to not attempt reordering of the packet. As described, for example, the transmitter (e.g., UE 115) can use a flag or flow identifier in the header to indicate a priority packet that does not require reordering (e.g., when common sequence number space is used for the priority and non-priority packets), and thus priority packet detecting component 242 can detect a priority packet based on the flag or a certain flow identifier.

In another example, in determining the PDUs corresponding to priority packets at Block 504, the receiver may, at Block 512, perform packet inspection of the plurality of PDUs to determine a priority packet type. In an aspect, priority packet detecting component 242, e.g., in conjunction with processor(s) 205 and/or memory 202, can perform packet inspection of the plurality of PDUs to determine a priority packet type. For example, priority packet detecting component 242 can determine whether the PDUs correspond to a certain type of packet known to be a priority packet (e.g., an ACK/NACK packet, a VoIP packet, etc.), and can accordingly process the PDU(s) corresponding to the priority packet and/or may determine a next PDU sequence number for non-priority packets based on determining the PDU(s) correspond to the priority packet. In one example, priority packet detecting component 242 can perform the packet inspection when an out of order PDU is received, and/or can inspect all incoming packets.

In an example, at Block 514, the receiver can separate the portion of the plurality of PDUs from a remaining portion of the plurality of PDUs for processing. In an aspect, packet processing component 240, e.g., in conjunction with processor(s) 205 and/or memory 202, can separate the portion of the plurality of PDUs from the remaining portion of the plurality of PDUs for processing. In one example, this can include packet processing component 240 delivering the plurality of PDUs determined to correspond to a priority packet to an upper layer (e.g., IP layer) for processing. In one example, where priority packet PDUs are received over one or more separate DRBs, packet processing component 240 can deliver the PDUs as received regardless of PDUs received over other DRBs. In another example, packet processing component 240 can separately process PDUs corresponding to priority packets as they arrive regardless of a status of processing PDUs corresponding to non-priority packets.

Figure 10:
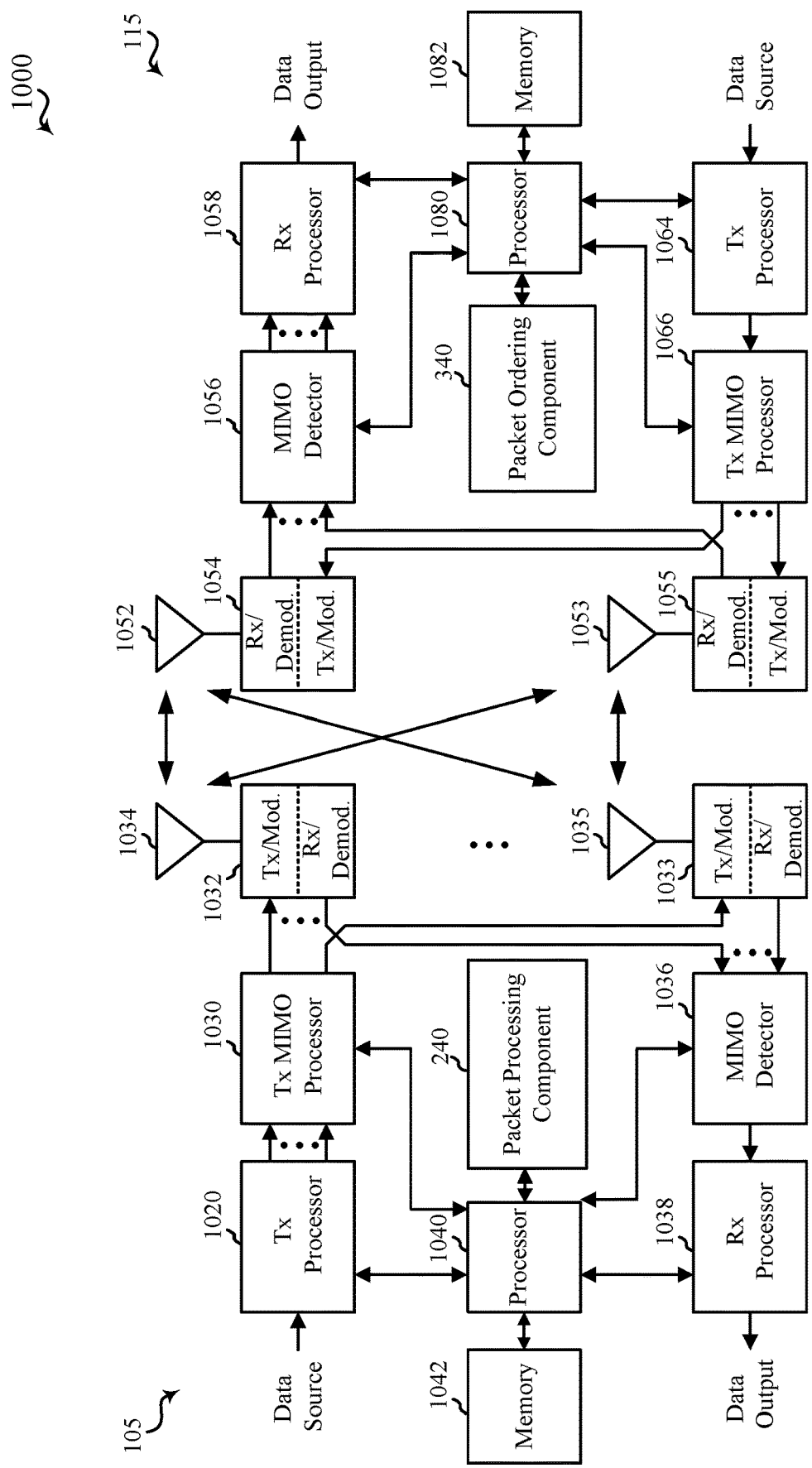
FIG. 10 is a block diagram illustrating an example of a MIMO communication system including a base station and a UE, in accordance with various aspects of the present disclosure.

FIG. 10 is a block diagram of a MIMO communication system 1000 including a base station 105 and a UE 115. The MIMO communication system 1000 may illustrate aspects of the wireless communication system 100 described with reference to FIG. 1. The base station 105 may be an example of aspects of the base station 105 described with reference to FIGS. 1, 2, and 3. The base station 105 may be equipped with antennas 1034 and 1035, and the UE 115 may be equipped with antennas 1052 and 1053. In the MIMO communication system 1000, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 115 may be an example of aspects of the UEs 115 described with reference to FIGS. 1, 2, and 3. At the UE 115, the UE antennas 1052 and 1053 may receive the DL signals from the base station 105 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 115 to a data output, and provide decoded control information to a processor 1080, or memory 1082.

The processor 1080 may in some cases execute stored instructions to instantiate a packet ordering component 340 (see e.g., FIGS. 1 and 3).

On the uplink (UL), at the UE 115, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for SC-FDMA, etc.), and be transmitted to the base station 105 in accordance with the communication parameters received from the base station 105. At the base station 105, the UL signals from the UE 115 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a packet processing component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 1000.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of transmitting data in wireless communications, comprising:
    establishing, with an access point, a priority data radio bearer (DRB) for transmitting priority data, wherein the priority DRB and a normal DRB are mapped to one evolved packet system (EPS) bearer, and wherein the normal DRB is for transmitting non-priority packets;
    receiving a set of packets for transmission in a defined sequence, the set of packets including two or more packets;
    detecting that a packet, of the set of packets, is a prioritized packet type;
    prioritizing the packet for transmission ahead of its order in the defined sequence based on the detection of the prioritized packet type, wherein prioritizing the packet comprises adding the packet to a priority buffer for transmitting over the priority DRB; and
    transmitting the packet ahead of its order in the defined sequence to the access point.

2. The method of claim 1, wherein the prioritized packet type corresponds to a priority packet, and wherein the detecting further comprises inspecting contents of the packet to detect the packet as the priority packet.

3. The method of claim 1, further comprising:
    adding one or more remaining packets in the set of packets to a buffer for transmitting over the normal DRB; and
    prebuilding one or more data units based on the defined sequence, the one or more data units being associated with the set of packets.

4. The method of claim 3, wherein transmitting the packet comprises transmitting the packet over the priority DRB ahead of the one or more prebuilt data units.

5. The method of claim 4, wherein transmitting the packet over the priority DRB ahead of the one or more prebuilt data units is based at least in part on an uplink grant received for the priority DRB.

6. The method of claim 1, further comprising requesting establishment of the priority DRB based at least in part of the detection of the presence of priority traffic in the normal DRB.

7. The method of claim 1, wherein prioritizing the packet comprises setting a communication layer packet type of the packet to be a priority packet type, wherein at least one packet of remaining packets in the set of packets are of a data or a control type, and wherein transmitting the packet comprises transmitting packets of the priority packet type ahead of packets of the data or the control type.

8. The method of claim 7, further comprising:
    assigning a first sequence number of a first set of sequence numbers to the packet based on the priority packet type of the packet; and
    assigning second sequence numbers of a second set of sequence numbers to the at least one packet of remaining packets in the set of packets based on a non-priority packet type.

9. The method of claim 8, wherein assigning the first sequence number is based on a first key, and wherein assigning the second sequence numbers is based on a second key different from the first key.

10. The method of claim 8, wherein the first set of sequence numbers and the second set of sequence numbers are from a different number space.

11. The method of claim 1, wherein prioritizing the packet comprises inserting the packet at an end of a transport block in a current transmission time interval.

12. The method of claim 1, wherein prioritizing the packet comprises inserting the packet at a first transport block in a next transmission time interval.

13. An apparatus for transmitting data in wireless communications, comprising:
    a transceiver for communicating one or more wireless signals via one or more antennas;
    a memory configured to store instructions; and
    one or more processors communicatively coupled with the transceiver and the memory, wherein the one or more processors are configured to:
        establish, with an access point, a priority data radio bearer (DRB) for transmitting priority data, wherein the priority DRB and a normal DRB are mapped to one evolved packet system (EPS) bearer, and wherein the normal DRB is for transmitting non-priority packets;
        receive a set of packets for transmission in a defined sequence, the set of packets including two or more packets;
        detect that a packet, of the set of packets, is a prioritized packet type;
        prioritize the packet for transmission ahead of its order in the defined sequence based on the detection of the prioritized packet type, wherein prioritizing the packet comprises adding the packet to a priority buffer for transmitting over the priority DRB; and
        transmit the packet ahead of its order in the defined sequence to the access point.

14. The apparatus of claim 13, wherein the prioritized packet type corresponds to a priority packet, and wherein the one or more processors are configured to detect that the packet is the prioritized packet type at least in part by inspecting contents of the packet to detect the packet as the priority packet.

15. The apparatus of claim 13, wherein the one or more processors are further configured to:
    add one or more remaining packets in the set of packets to a buffer for transmitting over the normal DRB; and
    prebuild one or more data units based on the defined sequence, the one or more data units being associated with the set of packets.

16. The apparatus of claim 15, wherein the one or more processors are configured to transmit the packet over the priority DRB ahead of the one or more prebuilt data units.

17. The apparatus of claim 16, wherein the one or more processors are configured to transmit the packet over the priority DRB ahead of the one or more prebuilt data units based at least in part on an uplink grant received for the priority DRB.

18. The apparatus of claim 13, wherein the one or more processors are configured to prioritize the packet at least in part by setting a communication layer packet type of the packet to be a priority packet type, wherein at least one packet of remaining packets in the set of packets are of a data or a control type, and wherein the one or more processors are configured to transmit packets of the priority packet type ahead of packets of the data or the control type.

19. The apparatus of claim 13, wherein the one or more processors are configured to prioritize the packet at least in part by inserting the packet at an end of a transport block in a current transmission time interval.

20. The apparatus of claim 13, wherein the one or more processors are configured to prioritize the packet at least in part by inserting the packet at a first transport block in a next transmission time interval.

21. The apparatus of claim 13, wherein the one or more processors are further configured to request establishment of the priority DRB based at least in part of the detection of the presence of priority traffic in the normal DRB.

22. An apparatus for transmitting data in wireless communications, comprising:
 means for establishing, with an access point, a priority data radio bearer (DRB) for transmitting priority data, wherein the priority DRB and a normal DRB are mapped to one evolved packet system (EPS) bearer, and wherein the normal DRB is for transmitting non-priority packets;
 means for receiving a set of packets for transmission in a defined sequence, the set of packets including two or more packets;
 means for detecting that a packet, of the set of packets, is a prioritized packet type;
 means for prioritizing the packet for transmission ahead of its order in the defined sequence based on the detection of the prioritized packet type, wherein prioritizing the packet comprises adding the packet to a priority buffer for transmitting over the priority DRB; and
 means for transmitting the packet ahead of its order in the defined sequence to the access point.

23. The apparatus of claim 22, wherein the prioritized packet type corresponds to a priority packet, and wherein the means for detecting inspects contents of the packet to detect the packet as the priority packet.

24. The apparatus of claim 22, further comprising means for requesting establishment of the priority DRB based at least in part of the detection of the presence of priority traffic in the normal DRB.

25. The apparatus of claim 22, further comprising:
 means for adding one or more remaining packets in the set of packets to a buffer for transmitting over the normal DRB; and
 means for prebuilding one or more data units based on the defined sequence, the one or more data units being associated with the set of packets.

26. The apparatus of claim 22, wherein the means for prioritizing the packet sets a communication layer packet type of the packet to be a priority packet type, wherein at least one packet of remaining packets in the set of packets are of a data or a control type, and wherein the means for transmitting the packet transmits packets of the priority packet type ahead of packets of the data or the control type.

27. A non-transitory computer-readable medium, comprising code executable by one or more processors for transmitting data in wireless communications, the code comprising:
 code for establishing, with an access point, a priority data radio bearer (DRB) for transmitting priority data, wherein the priority DRB and a normal DRB are mapped to one evolved packet system (EPS) bearer, and wherein the normal DRB is for transmitting non-priority packets;
 code for receiving a set of packets for transmission in a defined sequence, the set of packets including two or more packets;
 code for detecting that a packet, of the set of packets, is a prioritized packet type;
 code for prioritizing the packet for transmission ahead of its order in the defined sequence based on the detection of the prioritized packet type, wherein prioritizing the packet comprises adding the packet to a priority buffer for transmitting over the priority DRB; and
 code for transmitting the packet ahead of its order in the defined sequence to the access point.

28. The non-transitory computer-readable medium of claim 27, wherein the prioritized packet type corresponds to a priority packet, and wherein the code for detecting inspects contents of the packet to detect the packet as the priority packet.

29. The non-transitory computer-readable medium of claim 27, further comprising code for requesting establishment of the priority DRB based at least in part of the detection of the presence of priority traffic in the normal DRB.

30. The non-transitory computer-readable medium of claim 27, further comprising:
 code for adding one or more remaining packets in the set of packets to a buffer for transmitting over the normal DRB; and
 code for prebuilding one or more data units based on the defined sequence, the one or more data units being associated with the set of packets.

* * * * *